United States Patent
Ju et al.

(10) Patent No.: US 10,848,348 B1
(45) Date of Patent: Nov. 24, 2020

(54) LOW-COMPLEXITY CHANNEL ESTIMATOR FOR OFDM RECEIVERS

(71) Applicant: GM GLOBAL TECHNOLOGY OPERATIONS LLC, Detroit, MI (US)

(72) Inventors: Xi Ju, Troy, MI (US); Timothy J. Talty, Beverly Hills, MI (US); Fan Bai, Ann Arbor, MI (US); Dan Shan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/564,404

(22) Filed: Sep. 9, 2019

(51) Int. Cl.
*H04W 72/04* (2009.01)
*H04L 25/02* (2006.01)
*H04L 27/26* (2006.01)

(52) U.S. Cl.
CPC ...... *H04L 25/0212* (2013.01); *H04L 27/2695* (2013.01); *H04W 72/042* (2013.01)

(58) Field of Classification Search
USPC .................. 375/260; 370/329, 209
See application file for complete search history.

(56) References Cited

U.S. PATENT DOCUMENTS

| 8,638,870 | B2 * | 1/2014 | Sutivong | H04B 1/692 375/260 |
|---|---|---|---|---|
| 2009/0074088 | A1 * | 3/2009 | Tao | H04L 1/0007 375/260 |
| 2011/0274077 | A1 * | 11/2011 | Yamada | H04W 72/042 370/329 |
| 2012/0088453 | A1 * | 4/2012 | Hirata | H04B 1/7107 455/63.1 |
| 2013/0022011 | A1 * | 1/2013 | Enomoto | H04L 1/1671 370/329 |

* cited by examiner

Primary Examiner — Eva Y Puente
(74) Attorney, Agent, or Firm — Lorenz & Kopf LLP

(57) ABSTRACT

A processor-implemented method and a controller in a vehicle for estimating a wireless channel impulse response in a mobile environment are provided. The method comprises: receiving an orthogonal frequency-division multiplexing (OFDM) signal; applying a maximum likelihood estimator to the received OFDM signal to identify a data symbol that provides a smooth channel response; and estimating the channel impulse response by performing a division or reverse convolution operation between the received OFDM signal and the identified data symbol. The controller is configured to: receive an OFDM signal; apply a maximum likelihood estimator to the received OFDM signal to identify a data symbol that provides a smooth channel response; and estimate the channel impulse response by performing a division or reverse convolution operation between the received OFDM signal and the identified data symbol. The vehicle can use the estimated channel impulse response to decode data symbols from future instances of the OFDM signal.

20 Claims, 4 Drawing Sheets

LOW-COMPLEXITY CHANNEL ESTIMATOR FOR OFDM RECEIVERS

TECHNICAL FIELD

The present disclosure relates generally to system and methods for estimating a wireless channel impulse response and more particularly to system and methods for estimating a wireless channel impulse response in a mobile environment.

In a typical wireless network, reference signals (e.g., reference pilots) that are known at the receiver are inserted in transmissions by a transmitter. The receiver can use these reference pilots to estimate the wireless channel impulse response and use that estimate to recover data sent on nearby frequencies (e.g., data subcarriers). In mobile environments, both time-selective fading and frequency-selective fading can be severe rendering the reference pilots insufficient for channel estimation (e.g., estimating the channel impulse response).

Accordingly, it is desirable to provide systems and methods for improved estimation of the wireless channel impulse response in a mobile environment. Furthermore, other desirable features and characteristics of the present invention will become apparent from the subsequent detailed description of the invention and the appended claims, taken in conjunction with the accompanying drawings and the background of the invention.

SUMMARY

Systems and methods are provided for estimating a wireless channel impulse response in a mobile environment. In one embodiment, a processor-implemented method in a vehicle for estimating a wireless channel impulse response in a mobile environment is provided. The method includes: receiving an orthogonal frequency-division multiplexing (OFDM) signal; applying a maximum likelihood estimator to the received OFDM signal to identify a data symbol that provides a smooth channel response; and estimating the channel impulse response by performing a division or a reverse convolution operation between the received OFDM signal and the identified data symbol. The vehicle can use the estimated channel impulse response to decode data symbols from future instances of the OFDM signal.

In one embodiment, the maximum likelihood estimator is implemented using dynamic programming.

In one embodiment, the dynamic programming is implemented using a modified Viterbi decoder.

In one embodiment, the maximum likelihood estimator is implemented using a greedy algorithm.

In one embodiment, the applying includes applying a maximum likelihood estimator to a sub-channel of the received OFDM signal to identify one or multiple data symbols out of a set of data symbols.

In one embodiment, the OFDM signal uses a predetermined signal constellation, and the set of data symbols is defined by the predetermined signal constellation.

In one embodiment, the applying includes applying a maximum likelihood estimator to one or multiple sub-channels of the received OFDM signal to identify one or multiple data symbols out of a set of data symbols that provides the smoothest channel response.

In one embodiment, the Viterbi decoder maintains a series of states to record hypothesized data symbols and corresponding channel estimates, and searches the state transfer path where the variation of channel estimates is minimal.

In another embodiment, a controller configured as a channel estimator in a vehicle for estimating a wireless channel impulse response in a mobile environment is provided. The controller is configured to: receive an orthogonal frequency-division multiplexing (OFDM) signal; apply a maximum likelihood estimator to the received OFDM signal to identify a data symbol that provides a smooth channel response; and estimate the channel impulse response by performing a division or a reverse convolution operation between the received OFDM signal and the identified data symbol. The vehicle can use the estimated channel impulse response to decode data symbols from future instances of the OFDM signal.

In one embodiment, the maximum likelihood estimator is implemented using dynamic programming.

In one embodiment, the dynamic programming is implemented using a modified Viterbi decoder.

In one embodiment, the maximum likelihood estimator is implemented using a greedy algorithm.

In one embodiment, to apply the controller is configured to apply a maximum likelihood estimator to a sub-channel of the received OFDM signal to identify one or multiple data symbols out of a set of data symbols.

In one embodiment, the OFDM signal uses a predetermined signal constellation and the set of data symbols is defined by the predetermined signal constellation.

In one embodiment, to apply the controller is configured to apply a maximum likelihood estimator to one or multiple sub-channels of the received OFDM signal to identify one or multiple data symbols out of a set of data symbols that provides the smoothest channel response.

In another embodiment, a non-transitory computer readable storage medium embodying programming instruction for performing a method in a vehicle is provided. The method includes: receiving a plurality of measured signals representing values of measurable variables; receiving an orthogonal frequency-division multiplexing (OFDM) signal; applying a maximum likelihood estimator to the received OFDM signal to identify a data symbol that provides a smooth channel response; and estimating the channel impulse response by performing a division or a reverse convolution operation between the received OFDM signal and the identified data symbol. The vehicle can use the estimated channel impulse response to decode data symbols from future instances of the OFDM signal.

In one embodiment, the maximum likelihood estimator is implemented using dynamic programming.

In one embodiment, the dynamic programming is implemented using a modified Viterbi decoder.

In one embodiment, the maximum likelihood estimator is implemented using a greedy algorithm.

In one embodiment, the OFDM signal uses a predetermined signal constellation and the set of data symbols is defined by the predetermined signal constellation.

In one embodiment, the applying includes applying a maximum likelihood estimator to one or multiple sub-channels of the received OFDM signal to identify one or multiple data symbols out of a set of data symbols that provides the smoothest channel response.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, mobile communication, vehicle-to-vehicle communication, orthogonal frequency-division multiplexing (OFDM), and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The described systems, methods, apparatus, and techniques disclose a channel estimator that utilizes a dynamic programming method to derive channel estimates for OFDM systems. The described systems, methods, apparatus, and techniques can provide a channel estimator with a complexity equal to a Viterbi soft decoder that is suitable for hardware implementation.

Figure 1:
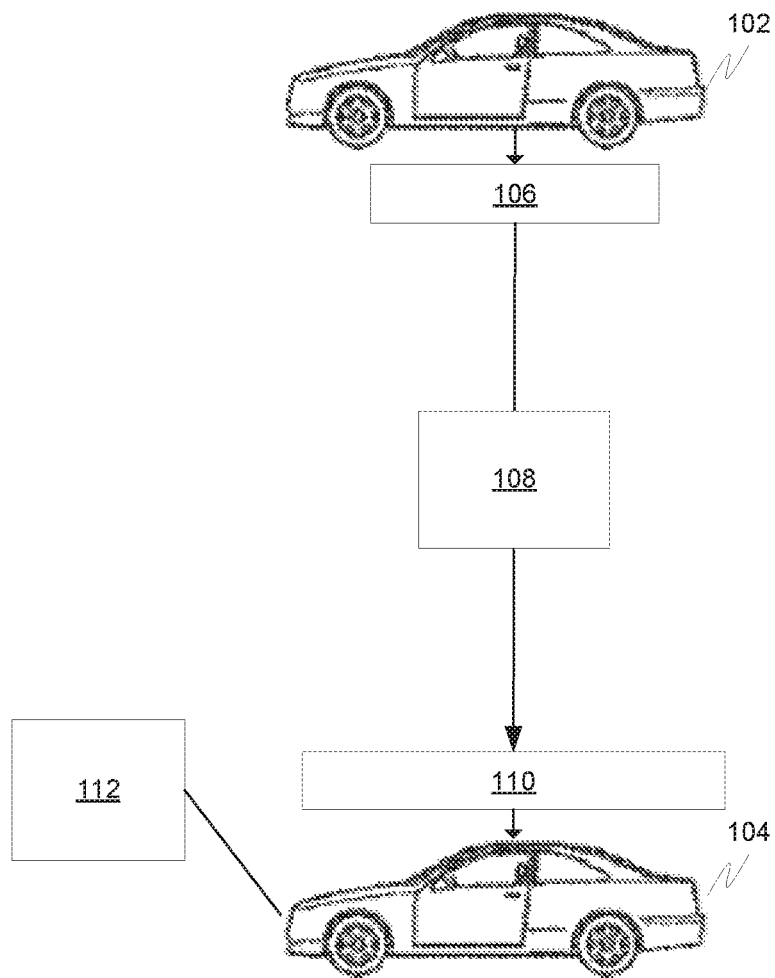
FIG. 1 is a block diagram depicting an example mobile environment in which a first vehicle communicates with a second vehicle and the second vehicle employs a channel estimator to facilitate communication, in accordance with some embodiments.

FIG. 1 is a block diagram depicting an example mobile environment in which a first vehicle 102 communicates with a second vehicle 104 using an OFDM system, such as WiFi, C-V2X, or LTE. In this example, the first vehicle 102 sends a message 106 with a data symbol designated $d_k$. The communication channel through which the message 106 is sent has an impulse response 108 designated $h_0(t)$. The second vehicle 104 receives a message 110 that is somewhat different from the sent message 106, but from which the sent message 106 can be recovered. It is well-known that the received message 110 (designated $r^i$) is equal to the transmitted message 106 ($d^i_k$) convolved with the channel impulse response $h_0(t)$ 108 plus noise (designated $n^i$) in the time-domain. In the frequency domain, the i-th subcarrier in an OFDM system can be modelled as follows: $r_i = d_i * h_i + n_i$ where $r_i$ is the received symbol at the i-th subcarrier; $d_i$ is the transmitted (data or pilot) symbol at the i-th subcarrier; "*" represents a multiplication operation, $h_i$ is the channel response at the i-th subcarrier corresponding to $h_0(t)$; and $n_i$ is the noise at the i-th subcarrier.

Because, in a mobile environment, the pilot signals may be insufficient to estimate the channel impulse response $h_0(t)$ 108, the receiving vehicle 104 includes a channel estimator 112 for estimating the channel impulse response to allow the vehicle 104 to recover the transmitted symbols $d^i_k$ from the message 106, for example, by estimating the transmitted message symbol $d^i_k$ 106 as being equal to the division of the received message $r_i$ 110 with the channel impulse response $h^i$ 108. This division operation in the frequency domain is equal to the deconvolution (reverse convolution) operation in the time domain.

Figure 2:
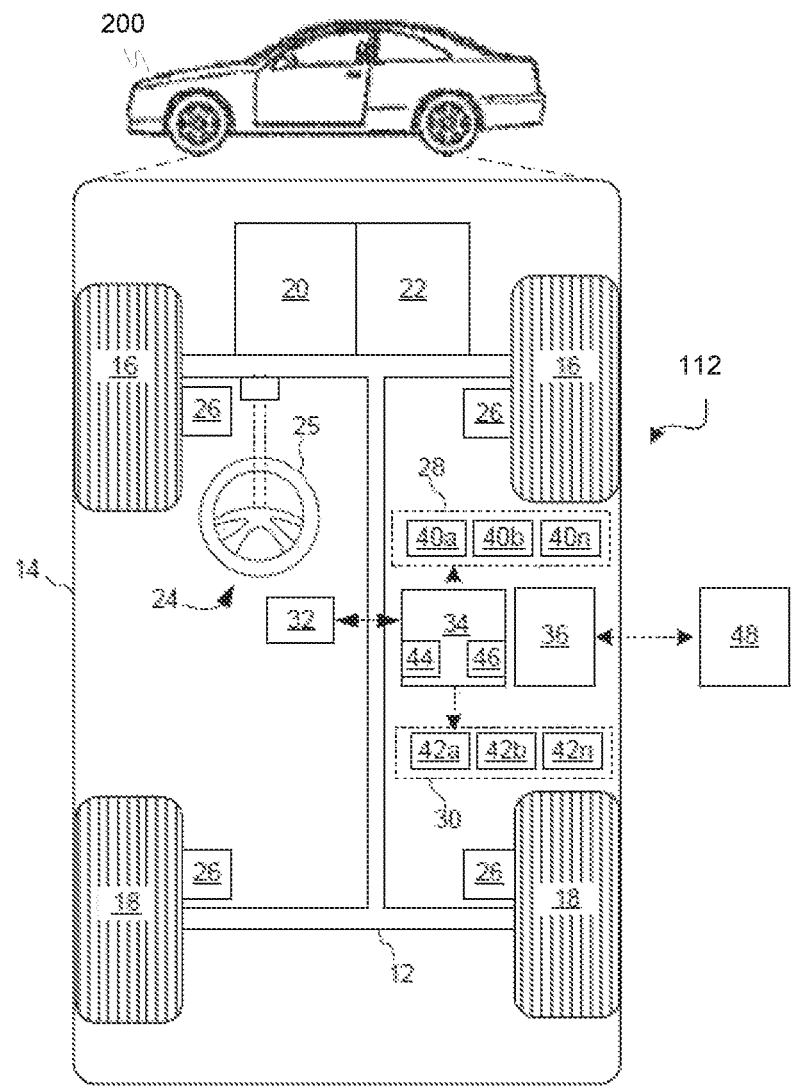
FIG. 2 is a block diagram of an example vehicle that can employ a channel estimator 112 for estimating the channel impulse response, in accordance with some embodiments.

FIG. 2 is a block diagram of an example vehicle 200 that can employ a channel estimator 112 for estimating the channel impulse response. The vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 200 may be capable of being driven manually, locally, remotely, autonomously and/or semi-autonomously.

The vehicle 200 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. In various embodiments, controller 34 implements an enhancement controller 103 for predicting transfer-of-control events and determining mitigating and/or enhancement actions for mitigating/enhancing the likelihood of the predicted transfer-of-control event occurring. Although only one controller 34 is shown in FIG. 1, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200. The controller 34, in this example, is configured to implement the channel estimator 112.

The controller 34 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions and/or hardware configurations, used by the controller. The programming instructions may include one or more separate programs, each of which comprises an ordered listing of executable instructions for implementing logical functions. The hardware configurations may include one or more netlists, each of which comprises the status and/or interconnection of circuit elements.

Figure 3:
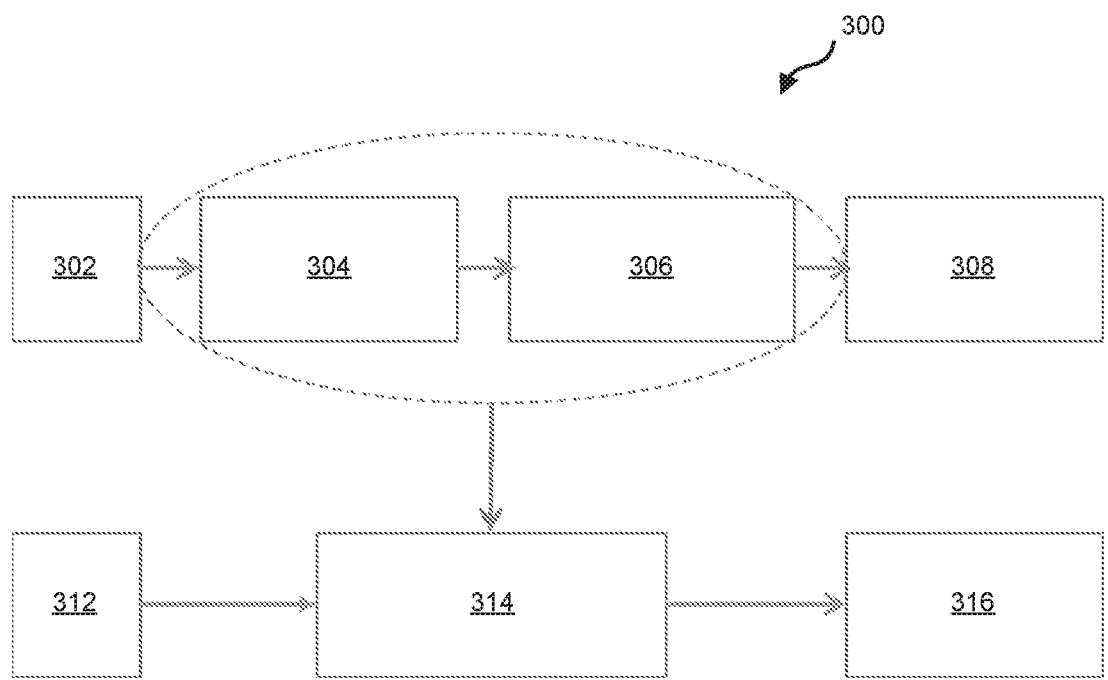
FIG. 3 is a flow diagram depicting an example process in an OFDM receiver, in accordance with some embodiments.

FIG. 3 is a flow diagram depicting an example process 300 in an OFDM receiver. When the use of pilot signals are sufficient for estimating the channel, the example process 300 includes receipt of a sync signal (operation 302), channel estimation using known techniques (operation 304), equalization using known techniques (operation 306) and symbol recovery, for example, using a Viterbi decoder (operation 308). When the use of pilot signals are not sufficient for estimating the channel, the example process 300 includes receipt of a sync signal (operation 312), channel estimation using dynamic programming (operation 314), (e.g., designed with maximum likelihood criteria and implemented by a modified Viterbi decoder), and channel decoding, for example, using a Viterbi decoder (operation 316). The major difference between the modified Viterbi decoder used for channel estimation (in operation 314) and the Viterbi decoder used for channel decoding (in operation 316) is that, the modified Viterbi Decoder is used for channel estimation and symbol recovery, while a conventional Viterbi decoder is used to reduce bit-error-rate.

A Viterbi decoder uses a Viterbi algorithm for decoding a bitstream that has been encoded using convolutional code or trellis code. A Viterbi algorithm is a dynamic programming algorithm for finding the most likely sequence of hidden states—called the Viterbi path—that results in a sequence of observed events.

Signals after synchronization (operations 302 and 312) can be represented by $r_i = d_i h_i + n_i$, where $d_i$ represents data symbols sent by the transmitter with finite alphabets (named constellation), $h_i$ represents channel response which is continuous at both frequency-domain and time-domain, and $n_i$ represents the noise and may be neglected. The Maximum Likelihood (ML) estimator at the receiver side can search for data symbols from the finite alphabets that derive the channel response that is smoothest at frequency-domain and/or time-domain, to derive $h_i$ and $d_i$ for every sub-channel indexed by i simultaneously. The search process is defined by:

$$[d_0, \ldots, d_{N-1}] = \arg\min_{all d_i \in \Psi, i=0, \ldots, N-1} \sum_{n=1}^{N-1} |\tilde{h}_n - \tilde{h}_{n-1}|,$$

where $\Psi$ is the domain of data symbols, determined by constellation. The ML estimator can be implemented by dynamic programming algorithms, such as the modified Viterbi decoder.

Channel estimates ($\tilde{h}_n$) can be derived (in the frequency-domain) from $\tilde{h}_n = r_n / \hat{d}_n$, where $r_n$ is the received message at the n-th subcarrier, $\hat{d}_n$ is the data symbol at the n-th subcarrier as hypothesized during the search process as described in the previous paragraph and "/" represents a division operation, which is equivalent to a reverse convolution operation in the time-domain.

The modified Viterbi decoder maintains a series of states, each of which corresponds to a hypothesized data symbol $\hat{d}_n$ and the estimated channel response $\hat{h}_n$ (with the estimation method described in the preceding paragraph, and searches the state transfer path where the variation in the set $[\hat{h}_0, \ldots, \hat{h}_{N-1}]$ is smallest (which means the channel response is smoothest). The modified Viterbi decoder is just one example of dynamic programming algorithms that can implement the ML estimator.

As an alternative to channel estimation using dynamic programming, a greedy algorithm may be used for channel estimation instead of dynamic programming. A greedy algorithm is an algorithmic paradigm that enumerates all possible choices, or all possible data symbols $[d_0, \ldots, d_{N-1}]$ sent by the transmitter in the case of this disclosure, and evaluates the corresponding result. A greedy algorithm may be applied to identify one or multiple data symbols that provide the smoothest channel estimate ($\tilde{h}_n$) derived from $\tilde{h}_n = r_n / \hat{d}_n$.

Figure 4:
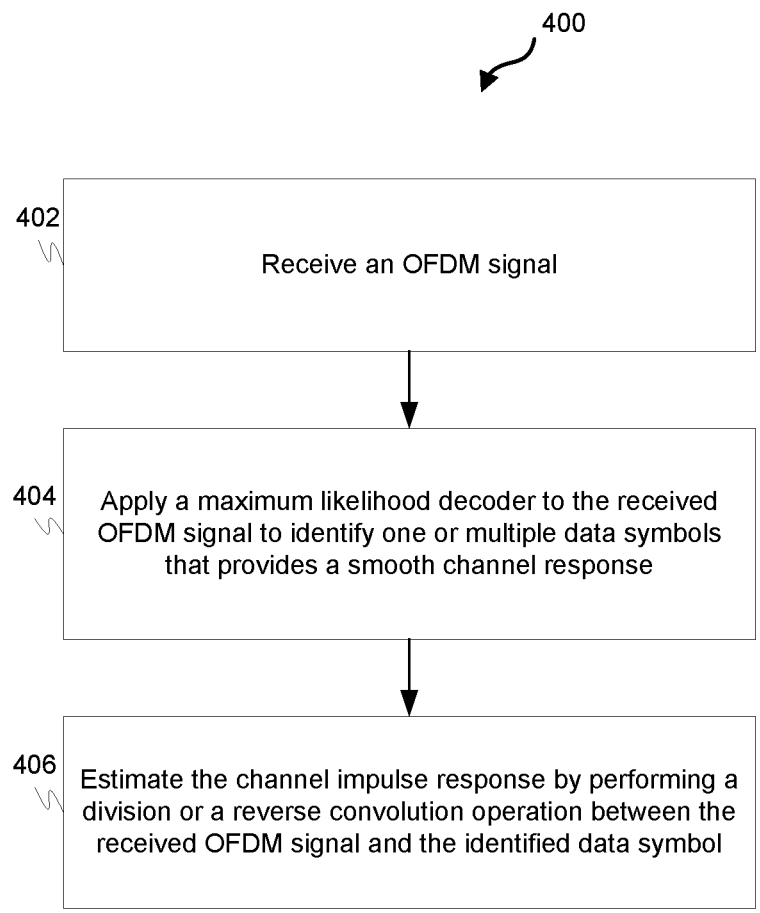
FIG. 4 is a process flow chart depicting an example process in a vehicle for estimating a wireless channel impulse response in a mobile environment, in accordance with some embodiments.

FIG. 4 is a process flow chart depicting an example process in a vehicle for estimating a wireless channel impulse response in a mobile environment. The example process 400 includes receiving an OFDM signal (operation 402). The OFDM signal may use a predetermined signal constellation. The set of data symbols is defined by the predetermined signal constellation.

The example process 400 includes applying a maximum likelihood estimator to the received OFDM signal to identify one or multiple data symbols that provides a smooth channel response (operation 404). The maximum likelihood estimator may be implemented using dynamic programming, for example a modified Viterbi decoder. The maximum likelihood estimator may also be implemented using a greedy algorithm. The applying may include applying a maximum likelihood estimator to a sub-channel of the received OFDM signal. The applying may include applying a maximum likelihood estimator to a sub-channel of the received OFDM signal to identify one or multiple data symbols out of a set of data symbols. The applying may include applying a maximum likelihood estimator to a sub-channel of the received OFDM signal to identify one or multiple data symbols out of a set of data symbols that provide the smoothest channel response.

The example process 400 includes estimating the channel impulse response by performing a division or a reverse convolution operation between the received OFDM signal and the identified data symbol (operation 406). The vehicle may use the estimated channel impulse response to decode data symbols from future instances of the OFDM signal.

The described systems, methods, apparatus, and techniques can provide for improvement/benefits in reliability, power efficiency, overhead consumption, complexity of offline channel estimation and timing. The described systems, methods, apparatus, and techniques may be applicable many high-speed wireless communications including WiFi, C-V2X, LTE and DTV. The described systems, methods, apparatus, and techniques may result in no modification to either hardware or software for the wireless transmitter, no modification to the existing standard, and enhance user experience in wireless connectivity and throughput.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method in a vehicle for estimating a wireless channel impulse response in a mobile environment, the method comprising:
   receiving an orthogonal frequency-division multiplexing (OFDM) signal;
   applying a maximum likelihood estimator to the received OFDM signal to identify a data symbol that provides a smooth channel response; and
   estimating the channel impulse response by performing a division or reverse convolution operation between the received OFDM signal and the identified data symbol;
   wherein the vehicle uses the estimated channel impulse response to decode data symbols from future instances of the OFDM signal.

2. The method of claim 1, wherein the maximum likelihood estimator is implemented using dynamic programming.

3. The method of claim 2, wherein the dynamic programming is implemented via a modified Viterbi decoder.

4. The method of claim 1, wherein the maximum likelihood estimator is implemented using a greedy algorithm.

5. The method of claim 1, wherein the applying comprises applying a maximum likelihood estimator to a sub-channel of the received OFDM signal to identify one or multiple data symbols out of a set of data symbols.

6. The method of claim 5, wherein the OFDM signal uses a predetermined signal constellation, and wherein the set of data symbols is defined by the predetermined signal constellation.

7. The method of claim 6, wherein the applying comprises applying a maximum likelihood estimator to one or multiple sub-channels of the received OFDM signal to identify one or multiple data symbols out of a set of data symbols that provides the smoothest channel response.

8. The method of claim 3, wherein the Viterbi decoder maintains a series of states to record hypothesized data symbols and corresponding channel estimates, and searches the state transfer path where the variation of channel estimates is minimal.

9. A controller configured as a channel estimator in a vehicle for estimating a wireless channel impulse response in a mobile environment, the controller configured to:
   receive an orthogonal frequency-division multiplexing (OFDM) signal;
   apply a maximum likelihood estimator to the received OFDM signal to identify a data symbol that provides a smooth channel response; and
   estimate the channel impulse response by performing a division or reverse convolution operation between the received OFDM signal and the identified data symbol;
   wherein the vehicle uses the estimated channel impulse response to decode data symbols from future instances of the OFDM signal.

10. The controller of claim 9, wherein the maximum likelihood estimator is implemented using dynamic programming.

11. The controller of claim 10, wherein the dynamic programming is implemented via a modified Viterbi decoder.

12. The controller of claim 9, wherein the maximum likelihood estimator is implemented using a greedy algorithm.

13. The controller of claim 9, wherein to apply a maximum likelihood estimator to the received OFDM signal the controller is configured to apply a maximum likelihood estimator to a sub-channel of the received OFDM signal to identify one or multiple data symbols out of a set of data symbols.

14. The controller of claim 13, wherein the OFDM signal uses a predetermined signal constellation and wherein the set of data symbols is defined by the predetermined signal constellation.

15. The controller of claim 14, wherein to apply a maximum likelihood estimator to the received OFDM signal the controller is configured to apply a maximum likelihood estimator to one or multiple sub-channels of the received OFDM signal to identify one or multiple data symbols out of a set of data symbols that provides the smoothest channel response.

16. A non-transitory computer readable storage medium embodying programming instruction for performing a method in a vehicle, the method comprising:
   receiving a plurality of measured signals representing values of measurable variables;
   receiving an orthogonal frequency-division multiplexing (OFDM) signal;
   applying a maximum likelihood estimator to the received OFDM signal to identify a data symbol that provides a smooth channel response; and
   estimating the channel impulse response by performing a division or reverse convolution operation between the received OFDM signal and the identified data symbol;
   wherein the vehicle uses the estimated channel impulse response to decode data symbols from future instances of the OFDM signal.

17. The non-transitory computer readable storage medium of claim 16, wherein the maximum likelihood estimator is implemented using dynamic programming.

18. The non-transitory computer readable storage medium of claim 16, wherein the dynamic programming is implemented via a Viterbi decoder.

19. The non-transitory computer readable storage medium of claim 16, wherein the maximum likelihood estimator is implemented using a greedy algorithm.

20. The non-transitory computer readable storage medium of claim 16, wherein the applying comprises applying a maximum likelihood estimator to one or multiple sub-channels of the received OFDM signal to identify one or multiple data symbols out of a set of data symbols that provides the smoothest channel response.

* * * * *